July 15, 1924.
C. A. BODDIE
REGULATOR SYSTEM
Filed Sept. 11, 1920
1,501,264
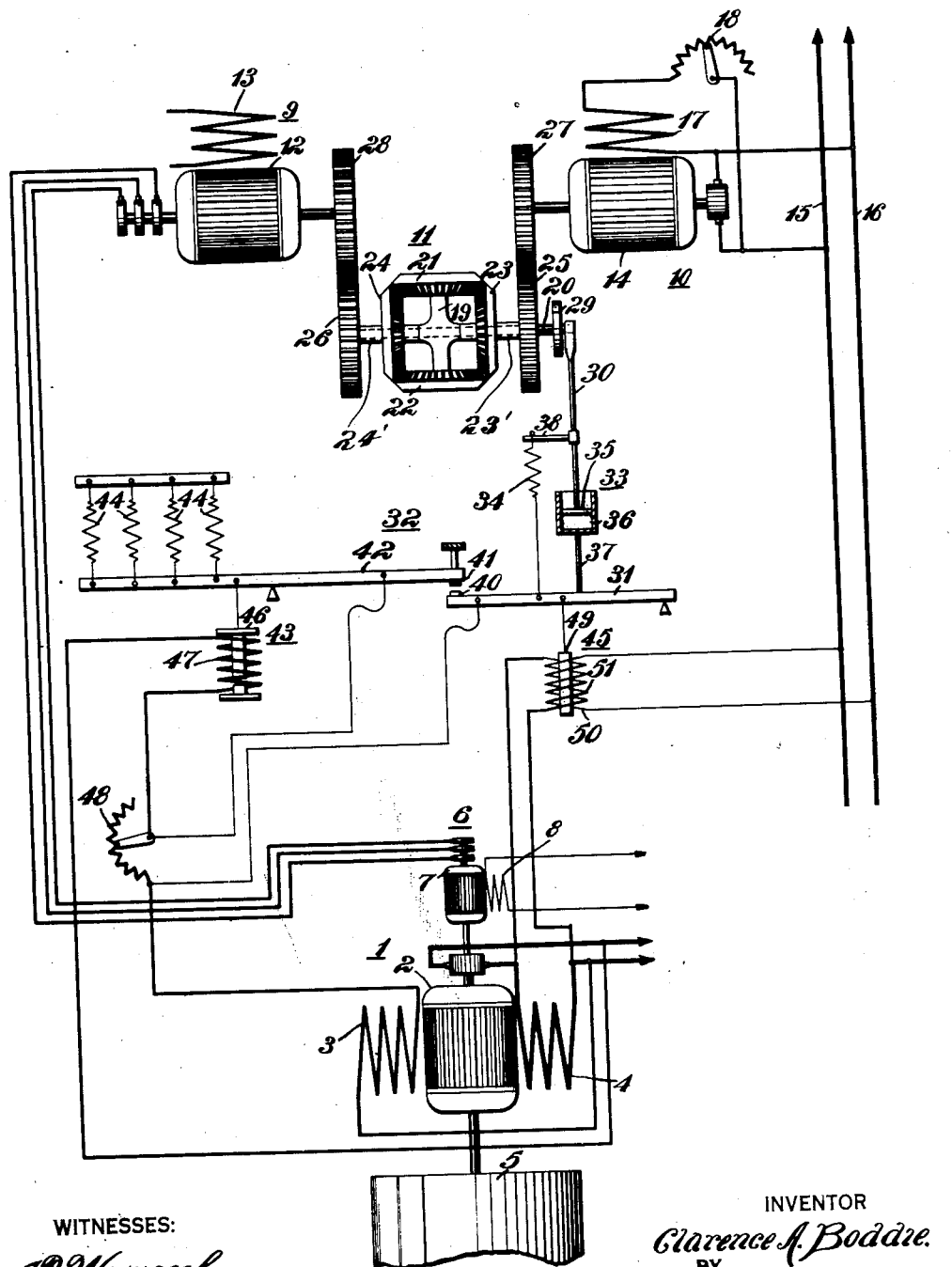
WITNESSES:
J.P. Weirmb.
W.B. Wells
INVENTOR
Clarence A. Boddie.
BY
Wesley G. Carr
ATTORNEY Patented July 15, 1924.

1,501,264

UNITED STATES PATENT OFFICE.

CLARENCE A. BODDIE, OF PITTSBURGH, PENNSYLVANIA, ASSIGNOR TO WESTINGHOUSE ELECTRIC & MANUFACTURING COMPANY, A CORPORATION OF PENNSYLVANIA.

REGULATOR SYSTEM.

Application filed September 11, 1920. Serial No. 409,719.

*To all whom it may concern:*

Be it known that I, CLARENCE A. BODDIE, a citizen of the United States, and a resident of Pittsburgh, in the county of Allegheny and State of Pennsylvania, have invented a new and useful Improvement in Regulator Systems, of which the following is a specification.

My invention relates to regulator systems and, particularly, to regulator systems for controlling the operation of electric motors.

One object of my invention is to provide a motor or other energy-translating device with a regulator system that shall be operated in accordance with any variation in speed of the motor and in accordance with the current flowing through the armature and the current flowing through the motor field winding and that shall be so operated as to prevent hunting action.

Another object of my invention is to provide two separate connecting means between the mechanism which is operated in accordance with any variation in speed of the motor and the regulator device which corrects the motor speed, for permitting a ready and a speedy correction of the motor speed for any variation therein.

In many industries, such, for example, as the rolling mill industry, motors are employed which are subjected to sudden and great changes in load but which must operate at substantially constant speed. The inherent regulating characteristics of a motor are insufficient to maintain the speed of a motor substantially constant under such conditions. Accordingly, a speed regulator system must be employed to insure the operation of each motor at substantially constant speed.

In a regulator system constructed in accordance with my invention, the main motor which is to be regulated, operates a small alternating-current generator which, in turn, operates a synchronous motor. The synchronous motor and a small constant-speed motor operate the end portions of a differential gear mechanism. The differential gear mechanism controls a regulating device for so governing the excitation of the main motor as to maintain the speed of such motor substantially constant.

The regulating device comprises two contact members which serve to short-circuit a resistor that is included in the shunt field-magnet winding of the main motor and which are respectively mounted on two movable levers. One of said levers is maintained in constant vibration by an electromagnet which is connected to the circuit of the shunt field-magnet winding of the main motor. The second lever is not only controlled by the differential gear mechanism but also by an electromagnet which is energized in accordance with the current flowing through the armature of the main motor.

The differential gear mechanism operates the second lever and, accordingly, the contact members in accordance with any variation in speed of the main motor. Such differential gear mechanism is connected to the lever by a dash-pot and a spring connection. Upon any operation of the differential mechanism, the dash-pot connection effects movement of the lever beyond that which is necessary to effect a correction in the speed of the main motor. However, before the main motor is operated at normal speed, the second or resilient connection modifies the movement of the lever which has been effected by the dash-pot connection. Such double connecting means between the differential gear mechanism and the regulating device effects an increase in the speed of operation of the system. The electromagnet which is energized in accordance with the current flowing through the armature of the main motor opposes the action of the differential gear mechanism on the second lever and serves to prevent hunting action.

The single figure in the accompanying drawing is a diagrammatic view of a regulator system constructed in accordance with my invention.

Referring to the drawing, a main motor 1, comprising an armature 2, a shunt field-magnet winding 3, and a compensating winding 4, is connected, in any suitable manner, to a roll 5, which may be one of a set of rolls (not shown). A small alternating-current generator 6, comprising an armature 7 and a field-magnet winding 8, is operated in accordance with the speed of the main motor 1. Preferably, the armature 7 of the alternating-current generator is mounted on the armature shaft of the main motor 1. The field-magnet winding 8 of the generator may be connected to any suitable source of direct current.

A synchronous motor 9 and a constant-speed motor 10 are provided for operating a differential gear mechanism 11. The synchronous motor 9 comprises an armature 12, which is electrically connected to the armature 7 of the generator 6, and a field-magnet winding 13, which is connected to any suitable source of direct current.

The constant-speed motor 10 comprises an armature 14, which is connected to a supply circuit comprising conductors 15 and 16, and a field-magnet winding 17, which is connected in series with a rheostat 18 to the supply conductors 15 and 16. If so desired, a regulating mechanism of any standard type, may be connected to the motor 10 for insuring its operation at a constant speed.

The differential gear mechanism 11 comprises a block member 19, which is fixed upon a shaft 20, and two beveled gears 21 and 22 which are rotatably mounted upon the block member 19. Two beveled gear wheels 23 and 24 are respectively mounted upon sleeves 23' and 24' that are loosely mounted on the shaft 20 and mesh with the gear wheels 21 and 22 which are mounted upon the block 19. Two gear wheels 25 and 26 are respectively connected to the beveled gear wheels 23 and 24. Two gear wheels 27 and 28, which are respectively mounted upon the armature shafts of the motors 10 and 9, are respectively in mesh with the gear wheels 25 and 26.

Thus, one end portion of the differential gear mechanism is operated at a constant speed by means of the motor 10 and the other end portion of such gear mechanism is operated at a variable speed by the synchronous motor 9 in accordance with the speed of the main motor 1. Consequently, the block member 19 and the shaft 20 are rotated in accordance with the variation in speed of the main motor 1 with reference to the motor 10.

A crank disc 29 is mounted upon the shaft 20 of the differential gear mechanism and serves to operate a rod 30. Such rod 30 is connected to a lever 31 of a regulating device 32 by means of a dash-pot 33 and a spring member 34. The dash-pot connection 33 comprises a piston 35 which is directly connected to the rod 30 and a cylinder 36 which is connected to the lever 31 by a rod 37. One end of the spring member 34 is directly connected to the lever 31 and the other end of the spring member is connected to an arm 38 which extends from the rod 30.

Upon any sudden change in speed of the main motor 1, the differential gear mechanism effects a substantial operation of the lever 31 by means of the dash-pot 33. Upon a gradual change in speed of the main motor, the differential gear mechanism effects operation of the lever 31 by means of the spring-connection 34.

The regulating device 32 comprises a contact member 40, which is mounted upon the lever 31, and a second contact member 41 which is mounted upon a lever 42. The lever 42 is operated by an electromagnet 43 which opposes the action of a plurality of spring members 44. The lever 31 is not only operated by the differential gear mechanism 11 but also by an electromagnet 45.

The electromagnet 43 comprises a core armature 46 which is pivotally connected to the lever 42 and a coil 47 which is connected in series with a rheostat 48 and the shunt field-magnet winding 3 of the main motor 1. The contact member 40 is connected to one terminal of the rheostat 48 and the contact member 41 is connected to the contact arm of such rheostat.

The electromagnet 45 comprises a core armature 49, which is pivotally connected to the lever 31, a coil 50, which is preferably connected across the supply conductors 15 and 16, and a coil 51, which is preferably connected across the compensating winding 4 in order to be energized in accordance with the current flowing through the armature 2 of the main motor. The electromagnet 45 receives a basic excitation by means of the coil 50 and operates the lever 31 in accordance with the current flowing through the armature 2. The electromagnet 45 opposes the action of the differential gear mechanism on the lever 31, and serves to prevent hunting action as will be hereinafter explained.

The electromagnet 43, which is connected to the lever 42, effects a constant vibration of such lever and the contact member 41, which is mounted upon it. Assuming the lever 31 to be held stationary, the spring members 44 and the electromagnet 43 operate the lever 42 to effect engagement between the contact members 41 and 40 in accordance with the field current of the motor 1 to maintain the same substantially constant. Upon engagement between such contact members, the resistance element of the rheostat 48 is short-circuited to increase the current flowing through the shunt field-magnet winding 3. Upon increase of such current flow, the energization of the electromagnet 43 is increased for operating the lever 42 to effect separation of the contact members 40 and 41. Such vibration of the lever 42 and the contact member 41 is constantly maintained during the operation of the regulator.

Assuming the main motor 1 to be operating at normal speed and there is an increase in load tending to reduce the speed of the main motor, an alternating current of reduced frequency is then supplied by the generator 6 to the synchronous motor 9. Accordingly, the motors 9 and 10 are not operated at the same speeds and the shaft 20 and the central portion of the differential gear mechanism effects a movement of rotation in a counter-clockwise direction. It should be borne in mind that for every load upon the motor 1 there is a corresponding position of the lever 31.

If the load change is gradual, the angular or phase displacement of the differential, and the corresponding movement of the rod 30 will likewise be gradual. Assuming that the gradual movement is such that the movement of the piston of the dash-pot 33 is not faster than will permit the fluid thereof to leak past the piston, the tension is reduced upon the spring 34, which is then the only connection between the lever 31 and the differential mechanism. Under a gradual load change, the displacement of the lever 31 is not fully proportional to the displacement of the differential, by reason of the spring connection between the differential and the lever 31. The relatively small movement of the lever 31 means that only relatively small corrective forces are set in motion, which is all that is required.

When the lever 31 is lowered by the differential gear mechanism 11 as above set forth, the lever 42 will have to move a greater distance to effect engagement between the contact members 41 and 40. Consequently, the resistor of the rheostat 48 is maintained in the circuit of the field-magnet winding 3 a greater portion of the time, thereby reducing the excitation of the main motor to effect equilibrium between the driving torque and the load torque of the main motor.

If the load change is large, or sudden, the angular displacement of the differential corresponds thereto and the dash-pot mechanism 33 temporarily becomes a rigid connection between the differential mechanism and the lever 31. The result is that the lever 31 is moved a relatively large distance to effect a quick correction of the motor 1 in the manner just described.

It will be apparent that it would not be desirable to maintain this extreme corrective condition until some reactionary force could be brought to bear upon the lever 31. This condition is met by the dash-pot 33. The normal leakage past the piston of the dash-pot will permit the lever 31 to seek its normal position under the action of the spring 34 so that the spring 34 determines where the lever 31 is to be stopped. The point at which the lever 31 is stopped is that point at which the proper corrective force for the particular load condition is being maintained upon the motor 1. In other words, the final position of the lever 31 under the corrective movement is that point at which the driving torque exactly balances the load torque, as set forth above.

Under the described operation the action of the regulator mechanism may be termed "dead beat". However, the action of the regulator has been mostly without regard to the electrical reactions within the driving motor, and, at times, the corrections may be too large or too sudden, tending to present hunting conditions because of the improper regulation. The characteristics of mill motors are such that, under certain load conditions, the armature of the motor 1 tends to draw current from the line and, under certain other conditions, the tendency to increase the speed of the motor is such as to cause it to feed power back into the line, producing the effect of a generator.

In the present application, a reactive effect upon the regulator is acquired in accordance with the variations in armature current by means of the electromagnet 45 which is connected on the opposite side of the lever 31 from the differential mechanism.

The characteristics of the armature current renders it necessary to provide a polarized electromagnet. Accordingly, the electromagnet 45 receives a basic excitation from the voltage coil 50 connected across the constant-potential circuit 15, 16. Superimposed upon the electromagnet 45 is a current coil 51 connected across the compensating field 4 of the motor 1 so as to be energized in accordance with the armature current. The pull upon the core armature of the electromagnet 45 will be proportional to the basic polarizing excitation and plus or minus depending upon the excitation received from the armature current.

The operation of the electromagnet 45 opposes the action of the differential gear mechanism and serves to so react upon the lever 31 as to prevent hunting action. Upon decrease in the excitation of the main motor 1, as above set forth, an increase in the current flow through the armature 2 is effected which, in turn, increases the strength of the electromagnet 45. Thereupon, the electromagnet 45 operates on the lever 31 to check any further increase in the armature current and prevent hunting action. The electromagnet 45 not only prevents hunting action but also prevents an abnormal ratio between the current flowing through the armature and the current flowing through the field-magnet winding, as will be apparent from the connections of the electromagnets 43 and 45 to the regulator.

In case the main motor 1 is operating above normal speed, the generator 6 supplies an alternating current above normal frequency to the synchronous motor 9. Thereupon, the normal speed ratio between the two motors 9 and 10 is changed and the differential gear mechanism 11 is operated to raise the lever 31. Accordingly, the time during which the resistor of the rheostat 48 is short-circuited is reduced and the excitation of the main motor 1 is increased to balance the driving torque and the load torque.

The armature current is reduced and consequently, the strength of the electromagnet 45 is reduced to reduce the force exerted by such electromagnet tending to raise the lever 31. Such change in the force acting on the lever 31 serves to prevent hunting action, as heretofore set forth.

As has been indicated above, if the lever 31 of the regulator was held stationary, the electromagnet 43 would control the lever 42 and the associated contact mechanism to maintain a constant current in the shunt field-magnet winding of the motor 1. Likewise, if the lever 42 was held stationary, the electromagnet 45 would control the lever 31 and the associated contact mechanism to maintain a substantially constant armature current for the motor 1. However, in the regulation of the motor 1 under an increased load, it is necessary to regulate for a greater armature current and a lesser field current so that the product of the field current and the armature current will equal the load torque.

The phase displacement of the driving motor from the constant-speed motor will initiate the corrective forces to obtain this condition, as indicated above. But the desired equilibrium may be reached while the main motor is still out of phase, necessitating an actual increase in speed of the motor to re-establish proper phase relations between the main motor and the reference motor. The differential will automatically perform this duty but, in doing so, it would immediately unbalance the torque conditions of the main motor. The electromagnets 43 and 45 will function to prevent the unbalance while the proper phase position of the motor 1 is being restored.

In the present problem, it is not only necessary to maintain equilibrium between the driving torque and the load torque but it is also necessary to match the speed of the main motor therewith. Each of these considerations is taken into account by the herein described regulator mechanism and automatically regulated for.

Modifications in the system and in the arrangement and location of parts may be made within the spirit and scope of my invention, and such modifications are intended to be covered by the appended claims.

I claim as my invention:—

1. In a regulator system, the combination with a motor, a differential gear mechanism operated in accordance with variations in the speed of said motor, and a lever having a resilient and a slowly yieldable connection to said gear mechanism, of means controlled by said lever for governing the excitation of said motor.

2. In a regulator system, the combination with a differential gear mechanism, and a regulating lever connected to said mechanism, of a dash pot and a resilient connection between said mechanism and the lever, said dash-pot connection being adapted to move the lever in accordance with the movement of said mechanism, and the resilient connection being adapted to effect final adjustment of the lever relative to said mechanism for each movement of the mechanism.

3. In a regulator system, the combination comprising an operating mechanism, a control lever operated by said mechanism and two separate connections between said mechanism and the lever, one of said connections effecting initial movement of the lever for certain movements of the mechanism and the second connection limiting the movement of the lever that is effected by the first connection.

4. In a regulator system, the combination with a motor, a mechanism operated in accordance with the speed of said motor, and means comprising a contact lever operated by said mechanism for controlling the excitation of the motor, of a spring connection and a dash-pot connection between said mechanism and the lever for so controlling said means as to obtain a quick correction when necessary of the field current of said motor for changes in speed thereof.

5. In a regulator system, the combination comprising a mechanism operated in accordance with the speed of a motor, and means comprising a device operated by said mechanism for governing the excitation of the motor, of two connections between said mechanism and said device, one of said connections operating the said device directly in accordance with sudden changes in the mechanism, and the second connection determining the operation of the device.

6. In a regulator system, the combination with a main motor, a generator operated in accordance with the speed of the main motor, a synchronous motor operated by said generator, a constant-speed motor, and a differential mechanism controlled by said motors, of a contact lever operated by said mechanism, a second contact lever operated in accordance with the current flowing through the field-magnet winding of the main motor, means comprising a pair of contact members operated by said levers for varying the current flowing through the main field-magnet winding, and a magnet energized in accordance with the current flowing through the main motor armature for opposing the action of the differential mechanism on the first lever to prevent hunting action.

7. In a regulator system, the combination with a motor having an armature and a field-magnet winding, and a differential gear mechanism operated in accordance with changes in speed of said motor, of a magnet energized in accordance with the current flowing through said field-magnet winding, a second magnet energized in accordance with the current flowing through said armature, and means comprising a pair of contact members controlled by said mechanism and said magnets for varying the excitation of the motor.

8. In a regulator system, the combination with a motor and means comprising a pair of contact members for controlling the speed of the motor, of a magnet operated in accordance with the motor field current for effecting vibration of said contact members, a mechanism operated in accordance with changes in speed of the motor for controlling the contact members, and a magnet energized in accordance with the current flowing through the armature for so controlling said contact members as to prevent hunting action.

9. In a regulator system, the combination comprising an operating mechanism, a device operated by said mechanism, and a resilient connection and a dash-pot connection between said mechanism and the device.

10. In a regulator system, the combination with a differential gear mechanism and a regulating lever connected to said mechanism, of a dash-pot connection between said mechanism and the lever for operating the lever directly in accordance with the operation of the mechanism, and a second connection between said mechanism and the lever for also operating said lever.

11. In a regulator system, the combination with an energy-translating device, of means operating upon variations in load upon said translating device to establish an equilibrium between the driving torque and the load torque thereof, and additional means adapted to maintain said equilibrium during further corrections if necessary, and for operating to prevent hunting action.

12. In a regulator system, the combination with an electric motor and a speed reference device, of means operating upon variations in the relative phase position of said motor and said speed reference device to establish an equilibrium between the driving torque and the load torque thereof and additional means adapted to maintain said equilibrium.

13. In a regulator system, the combination with an electric motor and a speed reference device, of means operating upon variations in the relative phase position of said motor and said speed reference device to establish an equilibrium between the driving torque and the load torque thereof, said means comprising a contact mechanism, and means acting upon said contact mechanism to maintain said equilibrium.

14. In a regulator system, the combination with an energy-translating device, of means operating upon variations in load upon said device to establish an equilibrium between the driving torque and the load torque thereof and comprising a regulator device, two operating connections for said regulator device whereby, under certain load variations, one of said connections only is effective to initiate the proper corrective forces and, under other load variations, both of said connections operate to first initiate excessive corrective forces and subsequently modify the excessive corrective forces to obtain a proper corrective action.

15. In a regulator system, the combination with an energy-translating device, of means operating upon variations in load upon said device to establish an equilibrium between the driving torque and the load torque thereof and comprising a regulator device, two operating connections for said regulator device whereby, under certain load variations, one of said connections only is effective to initiate the proper corrective forces and, under other load variations, both of said connections operate to first initiate excessive corrective forces and subsequently modify the excessive corrective forces to obtain a proper corrective action, and anti-hunting means therefor.

16. In a regulator system, the combination with an energy-translating device, of means operating upon variations in load upon said device to establish an equilibrium between the driving torque and the load torque thereof and comprising a regulator device, two operating connections for said regulator device whereby, under certain load variations, one of said connections only is effective to initiate the proper corrective forces and, under other load variations, both of said connections operate to first initiate excessive corrective forces to obtain a proper corrective action, and means for maintaining the condition of equilibrium so long as the load variation exists.

17. In a regulator system, the combination with an energy-translating device, of means actuated in accordance with variations in the operation of said translating device and comprising a regulator device and a plurality of operating connections for said regulator device whereby, under certain variations, a portion of said connections only is effective to initiate proper corrective action by said regulator device and, under certain other conditions, another portion of said connections initiates excessive corrective action by said regulator device, which excessive action is subsequently modified to obtain a proper corrective action.

18. In a regulator system, the combination with an energy-translating device, of means actuated in accordance with variations in the operation of said translating device and comprising a regulator device and a plurality of operating connections for said regulator device whereby, under certain variations, a portion of said connections only is effective to initiate proper corrective action by said regulator device and, under certain other conditions, another portion of said connections initiates excessive corrective action by said regulator device, which excessive action is subsequently modified to obtain a proper corrective action, and anti-hunting means therefor.

19. In a regulator system, the combination with an energy-translating device and a speed reference device, of means operative upon phase displacements of said translating device and said speed reference device to balance the driving torque and the load torque thereof, and additional means for maintaining this balanced condition during the period of phase readjustment of said device.

20. In a regulator system, the combination with a motor and means comprising a pair of contact members for controlling the excitation of said motor of a magnet controlled by the motor field current for effecting vibration of said contact members, a mechanism operated in accordance with the variations in speed of said motor for controlling said contact members, and a polarized electromagnet receiving energization from the armature current of said motor and adapted to react upon said contact mechanism to prevent hunting action.

21. In a regulator system, the combination with a motor, a mechanism operated in accordance with the speed of said motor, and means comprising a contact lever operated by said mechanism for controlling the excitation of the motor, of a spring connection and a dash-pot connection between said mechanism and the lever for controlling said means, and an electromagnet controlled in accordance with the operation of said motor to prevent hunting action.

22. In a regulator system, the combination with a differential gear mechanism, and a regulating lever connected to said mechanism, of a dash pot and a resilient connection between said mechanism and the lever, said dash-pot connection being adapted to move the lever upon certain movements of said differential mechanism and said resilient connection being adapted to move said lever upon certain other movements of said differential mechanism.

23. In a regulator system, the combination with a differential gear mechanism, and a regulating lever connected to said mechanism, of a dash pot and a resilient connection between said mechanism and the lever, said dash-pot connection being adapted to move the lever, upon certain movements of said differential mechanism, to produce an initial regulating action by said lever, said resilient connection co-operating with said dash pot to give a drooping characteristic to said regulating action.

24. In a regulator system, the combination with an energy-translating device, a speed reference device and a differential mechanism operated in accordance with the phase displacements of said translating device and said speed reference device, of regulator mechanism controlled by said differential and comprising a pair of pivoted levers, contact mechanism controlled thereby, and means for controlling the energy of said translating device, connections between said differential mechanism and said levers whereby a proper corrective action is initiated upon operation of said differential mechanism or an improper corrective action is initiated which is subsequently varied to effect proper corrective action, and means actuated in accordance with the operation of said translating device to react upon said regulator mechanism.

25. In a regulator system, the combination with a motor having an armature and a field-magnet winding, a speed reference device and differential mechanism operated in accordance with phase displacements of said motor and said speed reference device, of regulator means controlled by said differential and comprising a pair of levers, contact mechanism controlled thereby, an electromagnet connected to one of said levers and operated in accordance with the current of said field-magnet winding and a second electromagnet connected to the other of said levers and operated in accordance with the current of said armature, and a dash-pot connection and a spring connection between said mechanism and one of said levers.

In testimony whereof, I have hereunto subscribed my name this 8th day of September 1920.

CLARENCE A. BODDIE.